United States Patent

Kappel

[11] 4,220,344
[45] Sep. 2, 1980

[54] LAWN MOWER WITH VERTICALLY ADJUSTABLE WHEELS

[75] Inventor: Friedrich Kappel, Scheuerfeld, Fed. Rep. of Germany

[73] Assignee: Wolf-Gerate GmbH, Fed. Rep. of Germany

[21] Appl. No.: 900,082

[22] Filed: Apr. 26, 1978

[30] Foreign Application Priority Data

Apr. 29, 1977 [DE] Fed. Rep. of Germany ... 7713614[U]

[51] Int. Cl.² ............................................. B62D 65/00
[52] U.S. Cl. ..................................................... 280/43
[58] Field of Search ....................... 280/43.11, 43.13, 43

[56] References Cited

U.S. PATENT DOCUMENTS

| | | | |
|---|---|---|---|
| 1,201,957 | 10/1916 | Hall | 280/43 X |
| 2,867,960 | 1/1959 | Stiles et al. | 280/43 X |
| 2,879,074 | 3/1959 | Roberton et al. | 280/43 |
| 2,882,063 | 4/1959 | Strasel | 280/43 |
| 2,894,761 | 7/1959 | Knarzer | 280/43 |
| 2,915,318 | 12/1959 | Chesser | 280/43 |
| 3,334,911 | 8/1967 | Enters | 280/43 |

*Primary Examiner*—John J. Love
*Assistant Examiner*—Norman L. Stack
*Attorney, Agent, or Firm*—Ostrolenk, Faber, Gerb & Soffen

[57] ABSTRACT

A wheel for a lawn mower, or the like, is positioned on an axle. The axle has a detent groove formed in it. A chassis for the axle has two spaced apart walls with aligned sets of holes into which sets of holes the axle may be selectively inserted to adjust wheel height. A detent spring formed at one of the walls resiliently self-biases to engage in the detent groove in the axle to hold the axle in place. A cutout in that wall holds the detent spring and enables it to resiliently self-bias into the groove in the axle.

22 Claims, 2 Drawing Figures

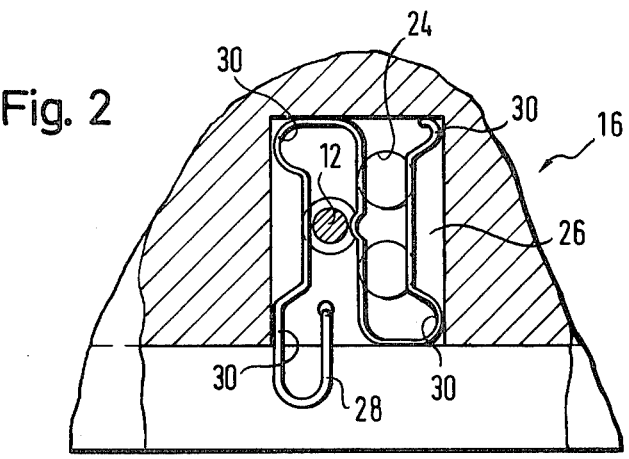
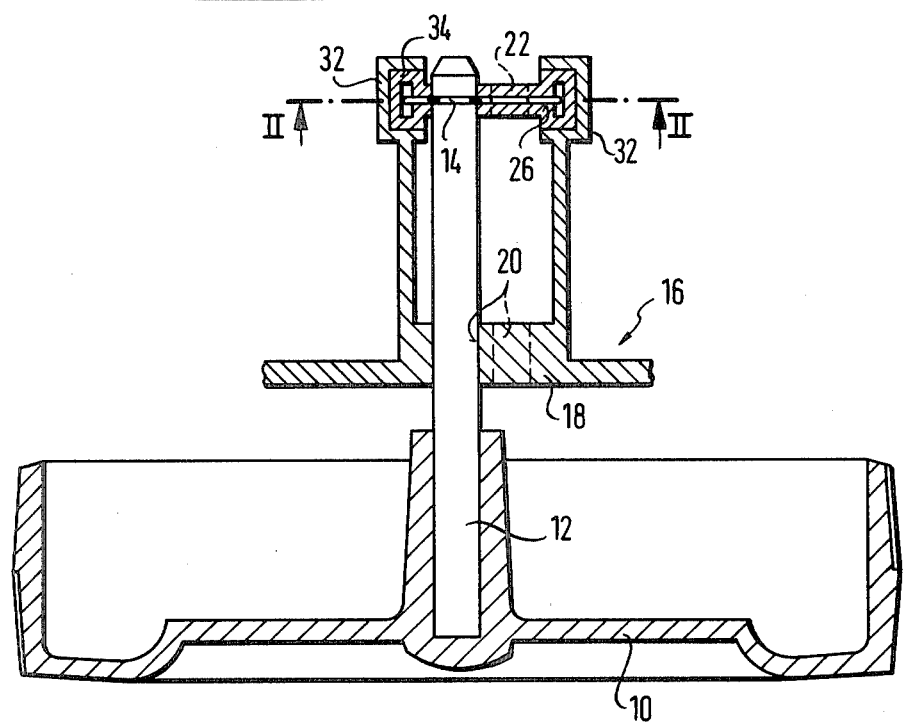

LAWN MOWER WITH VERTICALLY ADJUSTABLE WHEELS

The invention relates to a lawn mower with wheels which are adapted to be fixed with a plug axle vertically adjustably in holes of the chassis at different heights. This type of wheel mounting may be made very cheaply and is still widely used today, in particular in cheap lawn mowers in addition to verticle adjustments which are considerably simpler to operate and which permit, by pressing a button or adjusting a lever or even by foot operation, an easy adaptation to the particular conditions. The known wheel mountings operating with plug axles had on the plug axle a screw thread and by means of lock nuts the locking was effected on the chassis portion provided with holes, the lock nuts screwed onto the plug axle clamping the chassis between them. After long operation it is then impossible or extremely difficult to release the screws to change the vertical adjustment. In addition, such wheel mountings can only be used with solid sheet steel chassis, not with plastic chassis, which have recently come into use even for lawn mowers driven by an electric motor and have the advantage that they provide good electrical insulation.

The problem underlying the invention is to provide for a lawn mower provided with a plastic chassis a suitable and cheap plug axle mounting which is easy to operate and reliable.

According to the invention this problem is solved in that the chassis consisting of plastic comprises in a wall adjacent the wheels a plurality of bearing holes and in alignment with the latter in a second wall spaced therefrom a plurality of mounting holes into which at least one detent spring projects which engages in a detent groove extending over the periphery of the wheel axle.

In this manner, even with a plastic chassis of less strength than a sheet steel chassis satisfactory holding of the wheel axle is obtained because said axle is carried by two walls which are preferably further joined in the vicinity of the wheel axle mounting by transverse walls and made for example in this region as hollow beams. The detent mounting provides reliable running and permits simple replacement of the wheels even after long use and this adjustment of the vertical height may be effected with few manipulations.

The detent spring could also be secured at the wall adjacent the wheel and this construction is also covered by the invention, although said construction with detent spring in the remote wall is advisable because in this case on removal and insertion the wheel axle need not scrape along the detent spring over its entire length.

The detent spring is preferably mounted in a slot of the wall which may be formed by providing the wall with a recess over which a cover plate is placed. Alternatively, however, an insert body with slot and consisting of plastic or metal may be provided which receives the spring and is insertable via suitable rail mounting guides into said wall portion.

According to a preferred embodiment of the invention three holes are disposed above each other in various vertical locations, a centre hole preferably being laterally offset with respect to a superimposed holes to avoid weakening the plastic material of the walls too much at the insert location.

With this hole arrangement the detent spring constructed as wire spring may be bent substantially in S-shape so that it projects into all the holes on two diametrically opposite sides.

Hereinafter an example of embodiment of the invention will be described with the aid of the drawings, wherein:

FIG. 1 is an axial section of the wheel mounting of a wheel on a plastic chassis;

FIG. 2 is a section along the line II—II according to FIG. 1.

A steel plug axle 12 is injection moulded or secured in other manner into the hub of the plastic injection-moulded wheel 10. Said plug axle is provided at its end with a conical chamfer and has an encircling detent groove 14. In the example of embodiment illustrated the plastic chassis 16 comprises hollow beams extending in the longitudinal direction, in wall 18 of which adjacent the wheel, which has a somewhat greater wall thickness than the remaining parts of the chassis, three mounting holes 20 are formed whose axes lie on the corner points of an equilateral triangle, and in alignment with said holes plug holes 24 are provided in the opposite wall 22 of the hollow beam, of which just like the bearing holes 20 two are superimposed whilst the third is laterally offset with respect thereto between said holes. The opposite wall 22 comprises a slot recess 26 for receiving a wire spring 28 which is bent in generally S-shape as apparent from FIG. 2 and with its legs intersects the hole cross-section at two diametrically opposite sides. To obtain a favourable spring action the spring is bent so that it is supported at the slot edge via a bent portion on both sides only at the ends of the legs. These arcuate bent portions 30 serve for support whilst the legs therebetween can yield when the wheel axle is inserted and then engage resiliently into the detent groove 14. The slot 26 may be cut into the housing wall or maybe produced by providing the wall with a depression closable with a cover. According to the further embodiment illustrated in the drawings the chassis is provided with two U-shaped guide strips 32 whose open sides face each other and into said guide strips an insert body 34 fits which accommodates the wire spring in the centre slot 26.

I claim:

1. An adjustable position axle support, comprising:
   an axle for supporting a wheel; detent spring leg receiving means formed in said axle;
   a chassis by which said axle is to be received; said chassis including a wall; said wall having and defining a plurality of mounting holes therein, each for receiving said axle and for positioning said axle at a different position with respect to said chassis;
   detent spring means comprising a resilient strip in the form of a spring leg; said spring means leg being supported by and engaging said chassis and being normally resiliently self biased toward and defining an engaging detent connection with said receiving means for holding said axle in said mounting hole.

2. The axle support of claim 1, further comprising said chassis having a second wall thereof, spaced from said chassis wall, in which bearing holes are formed and through which said axle may pass as said axle extends toward a said mounting hole; each said bearing hole being aligned with a respective said mounting hole.

3. The axle support of claim 1, wherein said spring means comprises a resilient strip including a plurality of said legs; said spring means being supported by said chassis such that a said spring leg is normally biased toward and defines a detent connection with said receiving means in whichever said mounting hole said axle may be positioned.

4. The axle support of claim 3, wherein said spring means comprises a single resilient strip in which all said legs are defined and which said strip extends past all said mounting holes; said strip engaging said chassis and also being comprised of resilient material so that said legs thereof are resiliently self-biased toward engagement with said receiving means in whichever said hole said axle may be positioned.

5. The axle support of either of claims 1 or 4, wherein said receiving means comprise a groove defined in said axle and into which said strip may be resiliently self-biased.

6. The axle support of claim 4, further comprising said chassis having a second wall thereof, spaced from said chassis wall, in which bearing holes are formed and through which said axle may pass as said axle extends toward a said mounting hole; each said bearing hole being aligned with a respective said mounting hole.

7. The axle support of claim 4, wherein said mounting holes are arrayed at the corner points of an equilateral triangle; said chassis wall being vertical, and the base of said triangle being oriented also to be vertical.

8. The axle support of claim 4, wherein said mounting holes are arrayed at the corner points of a triangle.

9. The axle support of claim 8, further comprising said chassis having a second wall thereof, spaced from said chassis wall, in which bearing holes are formed and through which said axle may pass as said axle extends toward a said mounting hole; each said bearing hole being aligned with a respective said mounting hole.

10. The axle support of either of claims 7 or 8, wherein said spring means strip is generally S-shaped and is so oriented and shaped that one said leg thereof passes by one side of each said mounting hole and the neighboring said leg thereof passes by the opposite side of that said mounting hole.

11. The axle support of claim 10, further comprising a slot cut-out in said chassis wall, for defining an area through which said mounting holes pass and in which said spring means is positioned; said cut-out having and being defined by sidewalls against which said spring means rest and thereby engage said chassis;
said S-shaped strip having end portions both at the ends of its said legs and between said neighboring legs; said end portions being curved and bent for engaging said cut-out sidewalls.

12. The axle support of claim 4, further comprising a slot cut-out in said chassis wall, for defining an area through which said mounting holes pass and in which said spring means is positioned; said cut-out having and being defined by sidewalls against which said spring means rest and thereby engage said chassis.

13. The axle support of claim 4, wherein said spring means comprises a single strip, folded so as to pass by each said hole at two sides of said hole, and each portion thereof passing by a said hole comprising a said leg; each said leg being resiliently self-biased against said receiving means in any said hole from two different directions.

14. The axle support of claim 13, wherein said receiving means comprises a groove defined in said axle and into which said strip may be resiliently self-biased.

15. The axle support of claim 13, further comprising said chassis having a second wall thereof, spaced from said chassis wall, in which bearing holes are formed and through which said axle may pass as said axle extends toward a said mounting hole; each said bearing hole being aligned with a respective said mounting hole.

16. The axle support of claim 13, wherein said strip is folded so as to pass by each said hole at opposite sides of said hole.

17. The axle support of claim 16, further comprising a slot cut-out in said chassis wall, for defining an area through which said mounting holes pass and in which said spring means is positioned; said cut-out having and being defined by sidewalls against which said spring means rest and thereby engage said chassis.

18. The axle support of claim 17, wherein said chassis includes a separable insert piece which defines part of said wall thereof; said chassis further having guide strips thereon which defines another portion of said wall thereof and said guide strips being for receiving said insert piece removably therein;
said cut-out and said mounting holes being formed in said insert piece and said spring means being supported on said insert piece.

19. The axle support of claim 17, wherein said mounting holes are arrayed at the corner points of an equilateral triangle; said chassis wall being vertical, and the base of said triangle being oriented also to be vertical.

20. The axle support of claim 17, wherein said mounting holes are arrayed at the corner points of a triangle.

21. The axle support of either of claims 19 or 20, wherein said spring means strip is generally S-shaped and is so oriented and shaped that each said leg thereof passes by one side of a said mounting hole and the neighboring said leg thereof passes by the other side of that said mounting hole.

22. The axle support of claim 21, wherein said S-shaped strip having end portions at the ends of its said legs and between said neighboring legs; said end portions being curved and bent for engaging said cut-out sidewalls.

* * * * *